United States Patent [19]
Painter

[11] Patent Number: 6,039,140
[45] Date of Patent: Mar. 21, 2000

[54] THEFT PREVENTION ATTACHMENT SYSTEM

[76] Inventor: Robert Painter, W 237 S. 7735 Westwood Dr., Big Bend, Wis. 53103

[21] Appl. No.: 09/144,937

[22] Filed: Sep. 1, 1998

[51] Int. Cl.[7] .................................................. B60R 25/00
[52] U.S. Cl. ..................... 180/287; 280/728.2; 280/731
[58] Field of Search ................... 180/287; 280/728.2, 280/731

[56] References Cited

U.S. PATENT DOCUMENTS

| | | |
|---|---|---|
| 1,339,075 | 5/1920 | Toelle . |
| 4,144,729 | 3/1979 | Nielsen, Jr. . |
| 5,076,079 | 12/1991 | Monoson et al. . |
| 5,172,607 | 12/1992 | Wu ............................................. 74/552 |
| 5,214,945 | 6/1993 | Martin . |
| 5,505,483 | 4/1996 | Taguchi et al. ....................... 280/728.2 |
| 5,540,067 | 7/1996 | Kim . |
| 5,553,888 | 9/1996 | Turner et al. ............................ 280/731 |
| 5,566,560 | 10/1996 | LiCausi . |
| 5,595,078 | 1/1997 | Harrell . |
| 5,653,133 | 8/1997 | Passantino . |
| 5,676,001 | 10/1997 | Ho . |
| 5,676,396 | 10/1997 | Fohl ......................................... 280/731 |
| 5,709,110 | 1/1998 | Greenfield et al. . |
| 5,765,861 | 6/1998 | Ricks et al. ........................... 280/728.2 |
| 5,806,883 | 9/1998 | Cuevas .................................... 280/731 |
| 5,897,133 | 4/1999 | Papandreou ........................... 280/728.2 |
| 5,931,492 | 8/1999 | Mueller et al. ....................... 280/728.2 |

*Primary Examiner*—Brian L. Johnson
*Assistant Examiner*—Deanna Draper
*Attorney, Agent, or Firm*—Ryan Kromholz & Manion, S.C.

[57] ABSTRACT

A structure for preventing the theft of automobile airbags comprising a locking structure that obstructs access to fasteners used to attach an airbag to an automobile is disclosed. In addition, a method for preventing and deterring the theft of airbags is also disclosed. The method comprises the steps of obstructing access to the fasteners used to attach an airbag to an automobile and permanently imprinting one or more alphanumeric characters upon the airbag to identify the automobile in which the airbag has been installed.

8 Claims, 2 Drawing Sheets

THEFT PREVENTION ATTACHMENT SYSTEM

BACKGROUND OF THE INVENTION

The present invention is drawn to a system for preventing the theft of automobile airbags. More specifically, the present invention presents a device for preventing access to the connectors used to attach an airbag to an automobile. The invention further contemplates a method for preventing the theft of automobile airbags.

Most new automobiles produced in the U.S. and abroad are equipped with airbags. Airbags are useful in preventing injury to the occupants of an automobile, should the automobile be involved in an accident. Typically, an airbag will be mounted in the center of the steering wheel of an automobile. It is also very common to mount airbags within the dashboard of the automobile in front of the passenger seat of the auto. It is also becoming common for automobiles to be equipped with air bags in the driver and passenger doors and within the dashboard on the passenger and driver sides.

Because airbags function only once and because automobiles often survive the accidents that set off the airbags, it is often necessary to replace the airbags in an automobile. And since replacement costs may run as high as $1200, airbags have become very popular targets for auto thieves who are seeking to supply a thriving illicit trade in stolen airbags.

Generally, airbags are intentionally attached to an automobile in a manner that makes removable difficult. A typical structure for connecting an airbag to an automobile consists of a bolt having a capped end and a threaded end that is received by a bracket attached to the chassis of the airbag. The bolt is passed through a part of the automobile, such as the steering wheel, and received by the bracket on the chassis of the airbag. The bolt may be simply threaded into the bracket. To make removal difficult, the bolt may be provided with one-way threads, or other means of securement, to prevent removal from the steering wheel without first cutting the bolt. Also, the capped end of the bolt is usually seated in the bottom of a sleeve that is received in a socket in the reverse side of the steering wheel. The sleeve serves to minimize access to the capped end of the bolt and as a washer to prevent the bolt from pulling through the relatively soft padding of the steering wheel.

Though the structure for attaching an airbag to an automobile described above is more than up to the task of literally attaching the airbag to a steering wheel, it is typically easily defeated. Further, beyond the difficulty in removing an airbag from a steering wheel, there is no disincentive for a thief to steal the airbag and no disincentive for a repairman to use a stolen airbag.

Therefore it is an object of this invention to provide a structure that will make the endeavor of stealing an airbag exceedingly difficult and thereby provide a major disincentive to persons who would use illegal means to obtain the airbag.

It is also an object of this invention to describe a method of attaching an airbag to an automobile that will make it more difficult to steal the airbag and which will also deter the use of stolen airbags.

SUMMARY OF THE INVENTION

The present invention may be generally described as a theft-deterring, anti-theft attachment system for automobile airbags. The system preferably comprises at least one fitting secured to the undersurface of a conventional airbag and a locking structure. The locking structure comprises a coupling or connecting member, such as a modified headed bolt, arranged to secure the airbag fitting to a tamper-resistant, cuplike, retainer seated within an aperture provided in the steering wheel or dashboard airbag support. The headed end of the preferred bolt or connecting member is provided with a keyed recess or keyed embossment for receiving an insertion/removal tool which includes a matching key engageable with the keyed bolt head. The cuplike retainer has an open end, an apertured bottom end and an inner bore extending therethrough. The through bore of the retainer preferably includes an axial portion of enlarged diameter in communication with a smaller diameter portion terminating at the bottom end of the retainer. The aforementioned bolt extends through the aperture of the closed end of the retainer with its headed end being seated within the smaller diameter bore portion. The retainer is preferably threaded internally of the open end to receive a locking disc containing an indented or embossed tamper-resistant key engageable with a removal/insertion tool containing a matching keyed end.

In its preferred embodiment, the cuplike retainer further includes an exterior wall having major and minor diameter axial portions matching the configuration of an aperture existing in the steering wheel and/or dashboard-supporting wall.

The present invention further contemplates permanently inscribing upon the automobile airbag one or more alphanumeric characters that identify the automobile in which the automobile airbag is mounted. This identifying inscription, which may be conventional the manufacturer vehicle identification number (VIN), will act as an additional deterrent.

The invention also discloses a method of deterring the theft of automobile airbags comprising the steps of obstructing access to a plurality of connecting members used to attach the airbag to the automobile and inscribing permanently upon the automobile airbag one or more alphanumeric characters to identify the automobile in which the automobile airbag is mounted.

The method, in particular, further comprises the steps of providing the automobile airbag with a plurality of fitting affixed to the inwardly facing surface of the airbag, providing a plurality of connecting members, each having a threaded end and a capped end, the threaded end being arranged to be received by the fittings affixed to the automobile airbag, the threaded end of the connecting member being further arranged to prevent the removal of the connecting member from the fitting once the connecting member has been received in the bracket, providing a tamper-prevention structure that is received upon the connecting member such that the capped end of the connecting member is substantially inaccessible, and passing the connecting member through a selected location of the automobile and threading the threaded end of the connecting member into the fitting so as to secure the automobile airbag to the automobile.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
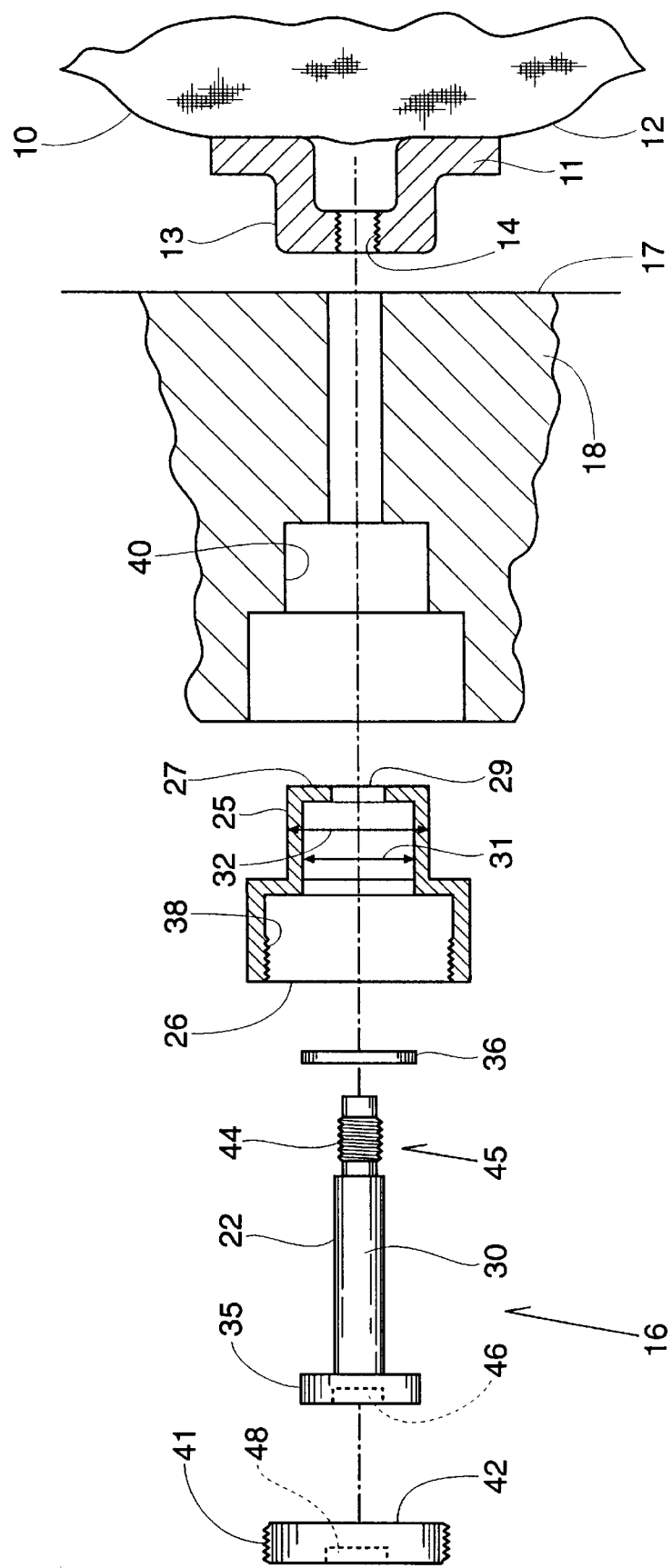
FIG. 1 is an exploded view of a structure for attaching an airbag to an automobile.
Figure 2:
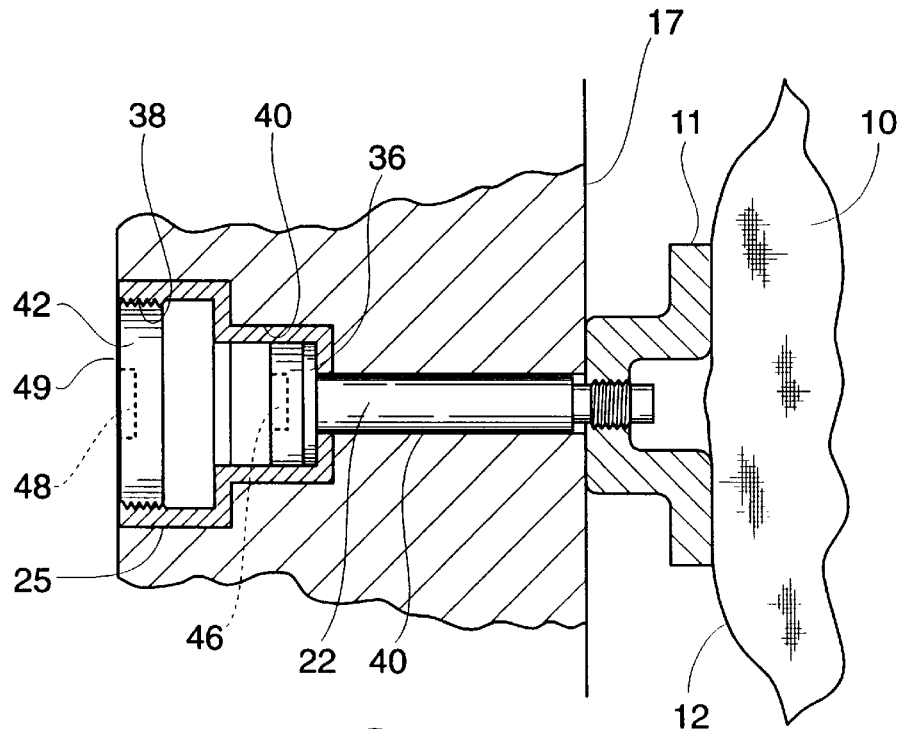
FIG. 2 is a fragmentary, cross sectional view of a structure for attaching an airbag to an automobile showing the airbag as it is attached to the automobile.

With reference to FIGS. 1 and 2, it will be observed that the present invention discloses a theft deterrent assembly or system for protecting vehicular airbags. The system preferably comprises a fitting 11 mounted on and attached to the undersurface 12 of a vehicular airbag 10. The fitting 11 may be made of a sheet steel stamping including a raised intermediate portion 13, having a threaded aperture 14. As desired, the aperture 14 may be threaded, as shown, or have a threaded nut (not shown) formed or welded to its underside. A locking structure 16 is provided for securing the airbag fitting 11 to the supporting surface 17 of a vehicular steering wheel or of a supporting dashboard 18. The locking structure 16 obstructs access to a one or more male connecting members 22 that are used to connect the airbag fitting 11.

The locking structure 16 of the present invention preferably includes the male connecting members 22, modified as described hereinbelow, and a hollow retainer 25 for receiving a respective connecting member, or bolt 22. The tamper-resistant retainer 25 is a hollow cylindrical sleeve drawn from sheet stock to provide an open-end portion 26 and a bottom closed-end portion 27. The bottom end portion 27 is apertured at 29 to receive the stem 30 of the bolt 22. The bottom end portion 27 of the retainer 25 is preferably cupped to provide relatively reduced inner and outer diameters 31 and 32, respectively. The inner diameter 31 is preferably selected to barely accommodate the headed end 35 of a respective connecting member or bolt 22, in order that a tool for prying (not shown) cannot be inserted between the inner diameter 32 of the retainer 25 and the headed end 35 of the connecting member 22. A suitable washer 36 of smaller diameter than the inner diameter 31 of the bottom end portion 27 is preferably provided between the headed end 35 and the bottom inner bottom surface 37 of the retainer 25.

As particularly illustrated in the view of FIG. 2, the locking structure 16, including the retainer 25 and bolt or connector 22 are seated within a conforming re-entrant opening in the steering wheel 18. The open-end portion 26 of the retainer 25 is preferably provided with interior threads 38. The retainer 25 of the locking structure 16 is preferably provided, at its open-end portion 26 with interior threads 36, or other similar locking configuration, such as threads 41 applied to the exterior surface of a locking disk 42.

As stated above, the male connecting member, or bolt 22 is preferably provided with a headed end 35 and a threaded end portion 45. The threads 44 of the threaded end portion 45 are preferably one-way threads. One-way threads are arranged so that the threaded end portion 45 may be easily threaded into an object, in this case the apertured airbag fitting 11, but are very difficult to disengage. The headed end 35 of the bolt 22 is provided upon its outer surface with means 46 for permitting tightening rotation of the bolt 22 to thread the threaded end 45 into the airbag fitting 11. A variety of configurations may be selected as driving means 46 for engaging a driving tool, such as a standard screw slot, a Phillips head screw slot. It is also conceivable to provide a one-way screw slot that permits the connecting member 22 to be threaded into an object, but does not permit the connecting member 22 to be removed therefrom.

Figure 3A:
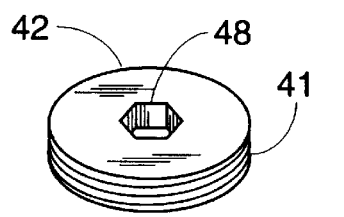
FIGS. 3a–3d illustrate various embodiments of a driving structure upon a locking structure.
Figure 3B:
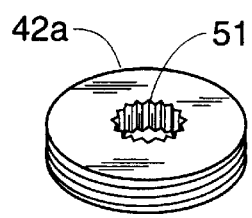
Figure 3D:
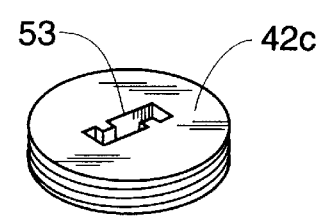
Figure 3C:
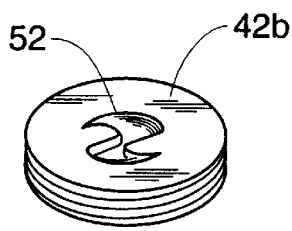

In order to function properly, the locking disk 42 must be made removable only by authorized persons. The threaded locking disk 42 is received by the threads of the open-end portion 26 of the retainer 25, and include tamper-resisting, keyed lock means 48 incorporated into the exposed outer surface 49 of the disk 42, as illustrated in FIGS. 3a–3d, inclusive. The retainer 25 preferably provided with interior threads 38 and the locking disk 42 may be provided with complementary threads 41 on its circumference to mate with the interior threads 38. In this instance the means for locking the locking disk 42 to the retainer 25, as illustrated in FIG. 3a, may comprise forming a hex-shaped keyed area 48, along with deforming the mating threaded areas 38 and 41 to deter or prevent removal of the disk 42 flow the retainer 35. The keyed area 48 is arranged for engagement with a conforming, mating surface on a tightening tool (not shown.) Further, the invention also anticipates reversing the keyed area 48 to provide an embossed, or raised area (not shown) arranged for engagement with a conforming formed in a tightening tool.

Figure 4:
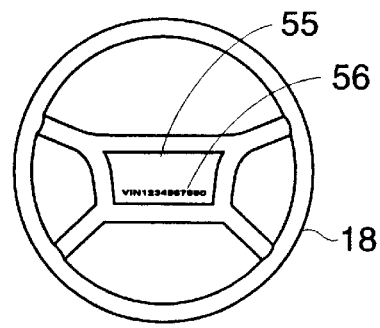
FIG. 4 illustrates a position of a vehicle identification number VIN) upon the exterior surface of an automobile airbag.

Other possible keying configurations are illustrated in the views of FIGS. 4b–4d, inclusive, wherein the keyed areas are configured to provide a toothed gear-shaped keyed area 51 for the locking disk 42a; a "FIG. 8" keyed area 52 for the disk 42b, and a "reverse notched" outlined area 53 for the disk 42c. The keyed area 52 is preferably cammed to permit only clockwise tightening rotation. Such configuration will permit insertion only of the disk 42b. Obviously, the various keyed areas require separate proprietary, complementary-shaped driving tools (not shown.) Again, it may be desired to deform the threads 41 and/or 38 for additional tamper-resistance. By limiting the supply of the tools with complementary keyed areas that mate with the proprietary keyed areas of the locking disks 42 and of the bolt heads 35, there will be even less likelihood that a thief would gain access to the headed end 35 of the bolts 22.

As a further deterrent to theft of automobile airbags, the present invention further teaches the application of a vehicle identification number (VIN) 56 directly upon the exterior surface 55 an airbag 10 mounted in a conventional vehicle steering wheel 18. With such number 56 being engraved or otherwise provided on individual airbags, theft investigators may immediately identify the bag with the original automobile. Conventional VIN numbers provide extensive information, even as to the color, manufacturer/customer and other identifying information that can be readily identified and compared. This technique, alone, will offer a ready deterrent to a potential airbag thief.

As mentioned previously, the present invention also contemplates a method of attaching an airbag 10 to an automobile to deter or prevent the theft of the airbag 10. The method comprises the steps of supplying a locking structure 16 comprising a hollow retainer 25 arranged to receive and conceal a bolt or other connecting structure 22 in its hollow bore portions 26,27; forming an aperture 40 in the mounting area of a conventional vehicle steering wheel 18; inserting the cuplike retainer 25 and its bolt 22 into the steering wheel aperture 40; obstructing access to the connecting member or bolt 22 by threading or otherwise mounting a closure member, or locking disk 42 to the open-ended portion 26 of the retainer 25; and providing proprietary keyed areas, 46 and 48 for receiving driving tools with conforming keys for insertion of the top surface of the bolt head 35 and to the exposed surface of the locking disk 42 enclosing the retainer 35; and permanently imprinting an identification number (VIN) 56 that identifies the automobile upon which the airbag 10 was originally mounted.

The novel method of attaching an airbag 10 to an automobile deters theft of an airbag by making a potential theft more difficult and by indicating, through the identification number 26, that the airbag 10 is not a replacement airbag but is, in fact, stolen The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An anti-theft attachment system for deterring the theft of automobile airbags, the system comprising:

at least one securement fitting affixed to an airbag;

a supporting member for said airbag, said supporting member containing at least one re-entrant opening having a partially enclosed end defining an aperture of reduced diameter;

an airbag locking structure including a connecting member having a first end arranged for securement with said fitting and a keyed headed end arranged to receive a keyed mounting tool, and a tamper-deterring, hollow retainer arranged to be seated in the re-entrant opening of said airbag support, said retainer having an open end portion and an apertured bottom end portion in axial alignment with the reduced diameter aperture of said airbag supporting member each arranged to receive and retain the headed end of said connecting member; and a cover arranged to enclose the open end of said retainer.

2. The anti-theft attachment system of claim 1, wherein the cover for the open-end portion of the retainer is provided with a keyed area on its outer surface for receiving a mating keyed portion of a proprietary insertion tool for deterring removal of the cover from the retainer.

3. The anti-theft attachment system of claim 1, wherein said cover and the interior wall of said open-end portion of said retainer each contain mating threads.

4. The anti-theft attachment system of claim 3, wherein the mating threads of said cover and interior threads of said open end of the retainer are deformed to further obstruct removal of said cover from the retainer.

5. The anti-theft attachment system of claim 1, wherein the first end of the connecting member and the aperture of said airbag fitting each includes mating threads.

6. The anti-theft attachment system of claim 5, wherein the mating threads are of one-way configuration.

7. The anti-theft attachment system of claim 1, wherein the open-end portion of said hollow retainer has an exterior surface diameter greater than the diameter of the exterior surface of the end portion of said retainer, and the bore of said reentrant opening is in substantial dimensional conformance with the exterior surface of said retainer so as to prevent withdrawal of said retainer and its connecting member in a direction towards the lesser diameter end of said re-entrant opening.

8. A method of deterring the theft of automobile airbags, the method comprising the steps of:

provding an apertured supporting member for the airbag, the apertures communicating with a re-entrant portion thereof, securely affixing a plurality of spaced apart securement fittings to an airbag;

providing a plurality of connecting members each having a threaded end and a headed end;

providing a plurality of hollow retainers for said connecting members such that the respective headed ends of the connecting members a re substantially inaccessible;

inserting said retainers into said re-entrant openings of said airbag supporting member;

respectively seating said connecting members within the bore of said retainers and through the apertures of the re-entrant openings of the airbag supporting members and securely engaging the threaded ends of the connecting members with said fittings affixed to the automobile airbag; and permanently inscribing upon the automobile airbag one or more alphanumeric characters to identify the automobile in which the automobile airbag is mounted.

\* \* \* \* \*